United States Patent [19]

Ober

[11] 4,091,851

[45] May 30, 1978

[54] LOG SPLITTING APPARATUS

[75] Inventor: Howard R. Ober, Chagrin Falls, Ohio

[73] Assignee: Trans-America Power Equipment, Inc., Chagrin Falls, Ohio

[21] Appl. No.: 787,951

[22] Filed: Apr. 15, 1977

[51] Int. Cl.² .......................... A47J 49/02; B27L 7/00

[52] U.S. Cl. ................................ 144/193 R; 144/3 K

[58] Field of Search ................ 144/194, 193 R, 193 J, 144/193 D, 3 K

[56] References Cited

FOREIGN PATENT DOCUMENTS

| | | | |
|---|---|---|---|
| 1,237,200 | 6/1960 | France | 144/193 |
| 1,453,288 | 7/1969 | Germany | 144/193 |

*Primary Examiner*—Travis S. McGehee

*Attorney, Agent, or Firm*—David A. Burge

[57] ABSTRACT

A portable log splitting apparatus is provided with a power source and a controllable drive system for selectively drivingly coupling the power source to a rotatable, screw-shaped wedge. The wedge has a complexly tapered, substantially conically shaped outer surface which extends from a pointed forward end to an enlarged diameter base. Threads are formed on the outer surface. A log or log portion to be split is positioned adjacent the pointed end of the wedge and, as the wedge rotates, its threads draw the log or log portion onto progressively larger diameter portions of the wedge, causing the log or log portion to split apart. One feature of the invention lies in the complexly tapered character of the outer surface of the wedge which, in comparison with prior uniformly tapered log splitting wedges, provides an improved splitting action, prevents logs from becoming "hung-up" on base portions of the wedge, and provides a reduction in friction forces encountered between the wedge and a log being split.

16 Claims, 4 Drawing Figures

LOG SPLITTING APPARATUS

BACKGROUND OF THE INVENTION

1. Field of the Invention

The present invention relates to novel and improved apparatus for splitting logs and, more particularly, to a portable log splitting apparatus of the type employing a threaded, rotatable wedge for safely, easily and rapidly splitting logs and log portions.

2. Prior Art

Power-driven log splitting apparatus of two types are known. One type utilizes a conventional, V-shaped wedge which is driven hydraulically into a log by clamping the log between a support member and the wedge. A drawback of this type of log splitting apparatus is that it must be relatively massively constructed to withstand the very substantial forces which are generated in driving a V-shaped wedge into a log to effect splitting of the log. Still another drawback is the requirement for a relatively large power source to generate the requisite forces. The resulting apparatus is of heavy, massive construction, and is costly to purchase and to operate.

The other type of power-driven log splitting apparatus employs a threaded, screw-shaped wedge which is rotated to thread itself into a log. Log splitting is effected as the log is drawn onto progressively larger diameter portions of the wedge. This type of apparatus requires no clamping of the log to effect splitting and is accordingly of simpler construction than hydraulically-powered clamping-type splitting equipment. Rotatable wedge log splitting apparatus is also characteristically lighter in weight, of more compact construction, and less costly to purchase and to operate than hydraulically-powered clamping-type splitting equipment.

While power-driven rotatable-wedge log splitting apparatus has been sold commercially for well over a decade, it has seen practically no technological improvement. All known rotatable-wedge log splitting apparatus have conventionally employed rotatable wedges which have constant tapers along their length as they extend from pointed forward ends to enlarged diameter base portions. No change has been made in this wedge construction since power-driven rotatable-wedge log splitting apparatus were introduced.

One problem encountered with the use of constant-taper rotatable wedges is that a relatively large surface area of the wedge is eventually brought into contact with a correspondingly relatively large surface area of the log being split, whereby very substantial friction forces are generated between these two relatively moving surface areas. This problem has been addressed by providing a power source of sufficient capacity to overcome the large friction forces. A further problem is that some logs are found to offer a greater resistance to splitting than others, and they eventually become "hung-up" on base portions of the wedge without having completed the desired splitting action. This problem has been resolved by stopping the operation of the machine to permit the operator to extricate the log from the wedge, usually through the use of hand implements to complete the splitting of the log.

SUMMARY OF THE INVENTION

The present invention overcomes the foregoing and other drawbacks of prior art proposals by providing a novel and improved, rotatable-wedge log splitting apparatus.

A portable log splitting apparatus is provided with a threaded, rotatable wedge having a complex curvature which increases progressively in inclination relative to its axis of rotation as it extends from a forward point toward a rearward base. The complex curvature of the wedge minimizes the surface area of contact between the wedge and a log being split, and thereby significantly reduces the magnitude of the friction forces which must be overcome to rotate the wedge and to effect log splitting. Forward-end portions of the wedge have a minimal angle of inclination thereby providing a needle-like point which threads easily into a log for a substantial distance to obtain the grip needed to effect a rapid and thorough splitting action as the log is drawn onto base-end portions of the wedge. Base-end portions of the wedge have a sharp angle of inclination which assures that logs drawn onto it will split cleanly, without becoming "hung-up" on the base.

In one embodiment, the angle of inclination of the outer-surface of the wedge increases in stepped increments. In another embodiment, the angle of inclination increases substantially continuously along the majority of the length of the rotatable wedge. In both embodiments, the most rapid increase in inclination is provided on base-end portions to assure that a rapid, thorough log splitting action takes place as a log is drawn onto the base end portions. In both embodiments, the outer surface is provided with a thread which extends from the pointed end along at least a majority of the length of the outer surface. In preferred practice, the thread extends continuously along the full length of the outer surface. In a less preferred embodiment, base end portions are provided with a smooth, non-threaded outer surface.

The described complexly tapered wedge arrangement provides an improved splitting action over that which obtains with prior constant-taper rotatable wedges, eliminates most problems encountered with logs becoming hung-up on base portions of rotatable wedges, and minimizes the drive power required to operate the apparatus.

It is a general object to provide a novel and improved log splitting apparatus and methods for splitting logs.

These and other objects and a fuller understanding of the invention described and claimed in the present application may be had by referring to the following description and claims taken in conjunction with the accompanying drawing.

DESCRIPTION OF THE PREFERRED EMBODIMENT

Figure 1:
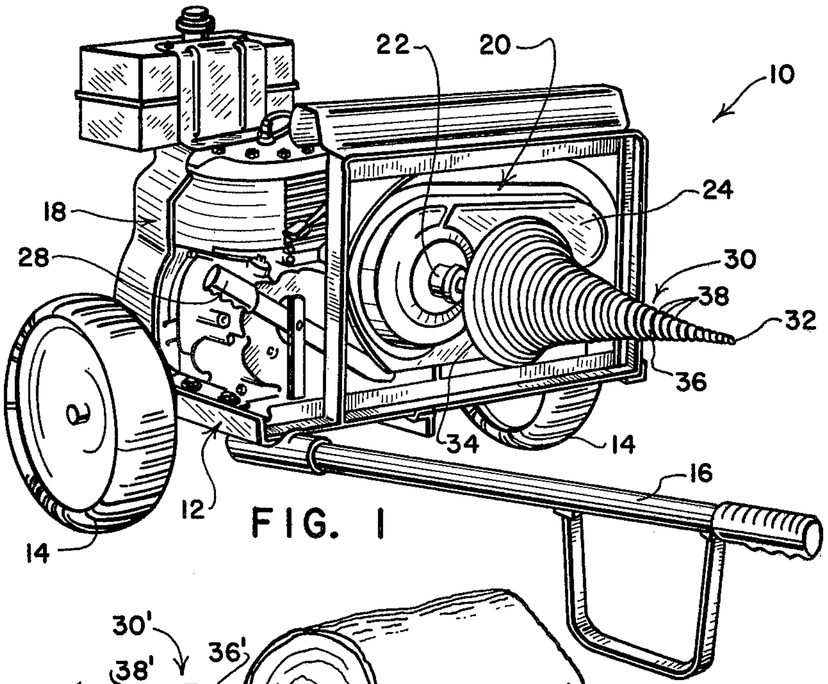
FIG. 1 is a perspective view of a rotatable-wedge log splitting apparatus embodying the preferred practice of the present invention.

Referring to FIG. 1, a log splitting apparatus embodying the preferred practice of the present invention is indicated generally by the number 10. The apparatus 10 includes a frame assembly 12 supported on two tired wheels 14 and having a tongue 16. A power source such as an internal combustion engine 18 is supported on the frame assembly 12. A drive-system, indicated generally by the numeral 20, is provided for selectively rotating a threaded, screw-shaped wedge 30.

The engine 18 is of any suitable conventional type, typically being of about a 5 to 8 horsepower capacity and having a maximum output speed of about 3500 to 3600 revolutions per minute. Other suitable power sources such as electric motors and the like may be used in place of the engine 18. An internal combustion engine is the preferred power source due to its simplicity and reliability.

The drive system 20 includes a shaft 22 which supports the wedge 30 and which defines an axis of rotation for the wedge 30. The drive system 20 also includes one or more suitable conventional speed reduction units 24 for reducing the drive speed transmitted to the wedge 30 from that of the engine output speed to about 60 to 70 revolutions per minute. A maximum wedge rotation speed of about 64 revolutions per minute is found to be particularly desirable inasmuch as it gives an operating speed which is slow enough to assure safe operation and yet which is fast enough to provide an efficient log splitting action.

The drive system 20 additionally includes a suitable clutch (not shown) for selectively drivingly coupling the engine 18 and the rotatable wedge 30. This clutch can be of a centrifugal type, being responsive to an increase in engine speed to establish a driving connection and being responsive to a decrease in engine speed to terminate the driving connection. Alternatively, the clutch can be of the type including a hand control lever 28 which, when moved to a downward position establishes a driving connection and which, when moved to the upward position shown in FIG. 1, terminates the driving connection.

The rotatable wedge 30 has a pointed forward end 32, an enlarged diameter base end 34, and a complexly tapered outer surface 36 which extends from the forward end 32 to the base end 34. In the embodiment of FIG. 1, a continuous thread 38 is formed along substantially the full length of the outer surface 36.

Figure 2:
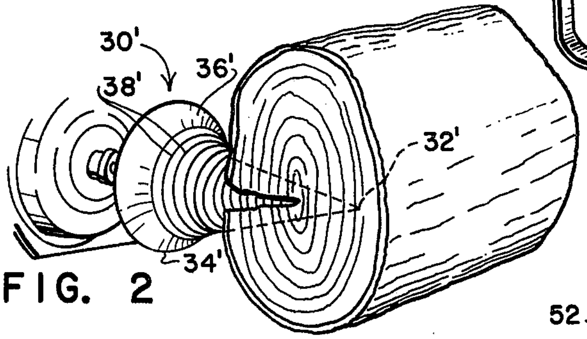
FIG. 2 is a perspective view of a portion of an alternate embodiment shown in the midst of a log splitting operation.

Referring to FIG. 2, an alternate wedge embodiment 30' has a pointed forward end 32', an enlarged diameter base end 34', and a complexly tapered outer surface 36' which extends from the forward end 32' to the base end 34'. In the embodiment of FIG. 2, a continuous thread 38' is formed along a majority of the outer surface 36'.

The apparatus 10 is operated by positioning a log or log portion to be split in engagement with the pointed forward end 32 of the rotatable wedge 30, and by operating the engine and drive system 18, 20 to rotate the wedge 30 at a speed of about 60 to 70 revolutions per minute. As the wedge 30 rotates, it bores into the log and initiates a splitting action, as is illustrated in FIG. 2. As the log is drawn onto progressively larger diameter portions of the wedge 30, a rapid splitting action ensues. Most logs being split require a steady increase in torque forces applied to the wedge 30 until the log suddenly "pops," indicating that its body has cracked through the entire depth of its thickness, whereafter all that remains to be done is to open the crack to sever the log into two pieces. The apparatus 10 requires about 10 to 15 seconds to complete the splitting of a normal 18 inch diameter log. Log lengths up to about 4 feet are easily split in a single operational cycle of the apparatus 10.

Figure 3:
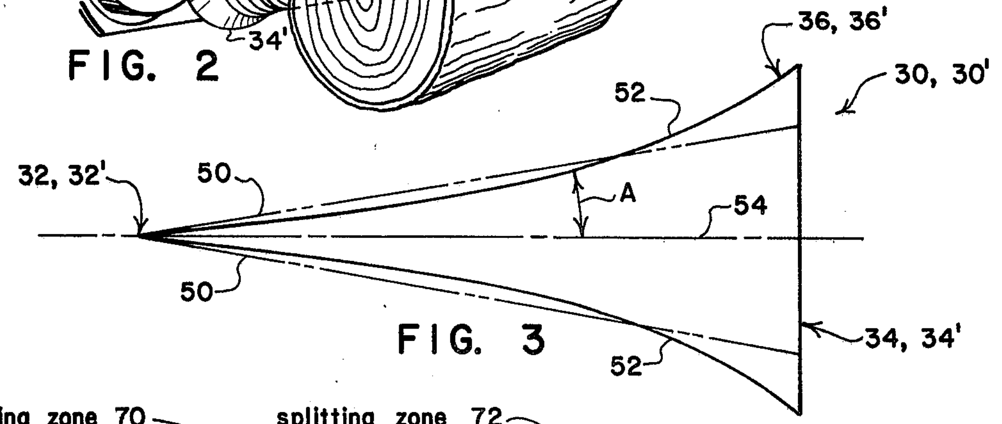
FIG. 3 is a schematic view illustrating one embodiment of progressive taper which can be utilized on the rotatable wedges of FIGS. 1 and 2.
Figure 4:
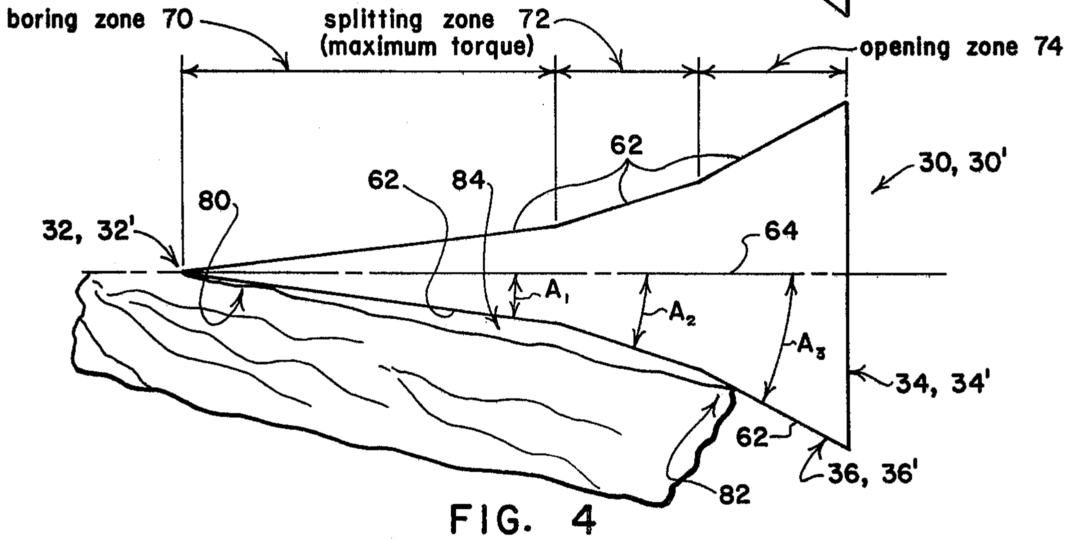
FIG. 4 is a schematic view illustrating another embodiment of progressive taper which can be utilized on the rotatable wedges of FIGS. 1 and 2.

Referring to FIGS. 3 and 4, the wedges 30, 30' may be provided with complexly tapered outer surfaces 36, 36' which are either progressively continuously tapered along portions of their length, as shown in FIG. 3, or which are provided with successive sections each having increasingly large angles of taper.

Referring particularly to FIG. 3, the type of constant taper used in prior art rotatable wedges is indicated by phantom lines 50. A preferred continuous taper for the outer surfaces 36, 36' of the wedges 30, 30' is indicated by complexly curved lines 52. The lines 50, 52 indicate the surfaces which form the roots of such threads 38, 38' as are provided on the surfaces 36, 36'. The lines 50 and the lines 52 are symmetrical about the axes of rotation of the wedges 30, 30', as indicated by a centerline 54 in FIG. 3.

The taper indicated by the lines 52 in FIG. 3 preferably forms an angle A of about 8° to 10° with the centerline 54 in the regions of the forward ends 32, 32', and preferably forms an angle A of about 25° to 35° in the regions of the base ends 34, 34'.

Referring particularly to FIG. 4, a preferred type of successively incrementally increasing taper for the outer surfaces 36, 36' of the wedges 30, 30' is indicated by broken lines 62. The lines 62 indicate the surfaces which form the roots of such threads 38, 38' as are provided on the surfaces 36, 36'. The lines 62 are symmetrical about the axes of rotation of the wedges 30, 30', as indicated by a centerline 64 in FIG. 4.

The taper indicated by the broken line 62 in FIG. 4 preferably includes three sections of successively increasing taper. In regions of the forward ends 32, 32', called "boring zones" 70, the outer surfaces 36, 36' form a taper angle $A_1$ of about 8° to 12° with the centerline 64. In central regions called "splitting zones" 72, the outer surfaces 36, 36' form a taper angle $A_2$ of about 15° to 18° with the centerline 64. In regions near the base ends 34, 34', called "opening zones" 74, the outer surfaces 36, 36' form a taper angle $A_3$ of about 19° to 22° with the centerline 64. In preferred practice, the taper angles $A_1$, $A_2$, $A_3$ are respectively about 10°, 17° and 20°. The taper angle $A_3$ can be as great as 45° to 60°, particularly if the opening zone 74 is not provided with threads on its outer surface.

The boring zone 70 shown in FIG. 4 is longer than the combined lengths of the splitting and opening zones 72, 74. In preferred practice, the boring, splitting and opening zones 70, 72, 74 have length proportions of 2 units to 1 unit to 1 unit, and the diameter of the base end 34, 34' is about 2½ to 3 units.

In the wedge embodiment 30' shown in FIG. 2, the thread 38' extends the full length of the boring and splitting zones 70, 72 but does not extend in the region of the opening zone 74. It is found that most logs will split properly without the need for threads on the opening zone 74, and that the threads provided on the boring and splitting zones 70, 72 will suffice to provide the threaded engagement needed to pull logs onto the wedge 30'.

Referring again to FIG. 4, a feature of the progressively tapered nature of the outer surfaces 38, 38' is that the surface area of engagement between the wedges 30, 30' and logs being split is minimized, whereby the magnitude of the friction forces generated between the wedges 30, 30' and the logs being split are correspondingly minimized. As is seen in FIG. 4, areas of contact between a log being split and outer wedge surfaces 36, 36' are indicated generally by the numerals 80, 82. A space 84 is maintained between the outer wedge surfaces and 36, 36' and the log being split at locations between the areas of contact 80, 82. While the showing of the space 84 in FIG. 4 is something of an oversimplificaion in view of the fact that threads are formed on the outer surfaces of the wedges 30, 30', it will be understood that any frictional forces generated between the wedges 30, 30' and logs being split in the region of the "space" 84 are substantially lesser in magnitude than those generated in the areas of principal contact 80, 82.

As will be apparent from a comparison of the lines 50, 52, 62, forward end portions of the wedges 30, 30' are more pointed than those of conventional constant taper wedges, and therefore require less initial driving torque to thread them into a log. Base-end portions of the wedges 30, 30' are of substantially greater taper than is customary on constantly tapered prior art wedges, thereby providing the described advantage of minimizing the areas of contact between the wedges 30, 30' and logs being split. Similarly, base-end portions of the wedges 30, 30' are of substantially larger diameter than are the base-end portions of prior art wedges, thereby providing a better splitting action and assuring that logs do not become hung-up on the base-end portions. Moreover, these improvements in wedge configuration and operation are provided without requiring any increase in overall wedge length.

The maximum torque application required during log splitting normally occurs while the leading surface of a log being threaded onto one of the wedges 30, 30' is in contact with the wedge's splitting zone. Particularly obstinate logs do not "pop" until their leading edge is in engagement with the opening zone. The sharply tapered nature of the opening zone assures that both normal and obstinate logs complete a desired splitting action as they thread onto the wedges 30, 30'.

As will be apparent from the foregoing description, the present invention provides a compact, portable log splitting apparatus of simple construction which is relatively inexpensive to fabricate, which requires minimal drive input power for operation, and which permits firewood to be split safely, easily and rapidly. The apparatus 10 is of simple, trouble-free design and can be employed dependably to split about a cord of wood per hour. The novel and improved configuration of the wedges 30, 30' provides an improved splitting action, prevents logs from becoming "hung-up" on base-end portions of the wedges 30, 30', and minimizes frictional forces generated between logs being split and the wedges 30, 30'.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A portable log splitting apparatus, comprising:

a. a frame supported on wheels;

b. a power source carried on the frame;

c. a screw-shaped wedge supported on the frame for rotation about a central axis;

d. a drive system for selectively drivingly coupling the power source and the wedge to rotate the wedge about the central axis;

e. the wedge having portions which are substantially symmetrical about the central axis including portions defining a pointed forward end, portions defining an enlarged diameter base axially spaced from the forward end, and portions defining a tapered outer surface extending between and providing a substantially smooth transition between the forward end portions and the base portions;

f. thread means formed on the outer surface and extending from the forward end portions at least along a majority of the length of the outer surface for threading the wedge into a log portion to be split when the wedge is rotated about the central axis;

g. the outer surface having forward portions inclined at a relatively small angle of inclination to the central axis defining a boring zone along the forward end region of the outer surface, and having rearward portions inclined at a relatively larger angle of inclination to the central axis defining an opening zone along the rearward end region of the outer surface; and, h. the outer surface additionally including a splitting zone located intermediate the boring and opening zones and having outer surface portions which are inclined at an angle to the central axis intermediate the magnitudes of the angles of inclination of the forward and rearward portions.

2. The apparatus of claim 1 wherein the splitting zone includes adjacent, axially spaced outer surface portions of progressively greater inclination which form a substantially continuous transition between the angles of inclination of the forward and rearward portions.

3. The apparatus of claim 1 wherein the boring, splitting and opening zones each have separate, substantially constant angles of inclination along their respective lengths.

4. The apparatus of claim 3 wherein the boring, splitting and opening zones have proportional respective lengths of about 2 units to 1 unit to 1 unit.

5. The apparatus of claim 4 wherein the wedge has a base diameter at the rearward end of the outer surface within the range of about $2\frac{1}{2}$ to 3 units in comparison with 2:1:1 ratio of lengths of the boring, splitting and opening zones.

6. The apparatus of claim 1 wherein the boring zone inclination angle is within the range of about 8° to 12°.

7. The apparatus of claim 1 wherein the opening zone inclination angle is within the range of about 19° to 22°.

8. The apparatus of claim 1 wherein the splitting zone inclination angle is within the range of about 15° to 18°.

9. A rotatable screw-shaped wedge for use in splitting logs and log portions, the wedge being rotatable about a longitudinally extending central axis and having portions which are substantially symmetrical about the central axis, including:

a. portions defining a pointed forward end;

b. portions defining an enlarged diameter base axially spaced from the forward end;

c. portions defining a tapered outer surface extending between and providing a substantially smooth transition between the forward end portions and the base portions;

d. thread means formed on the outer surface and extending from the forward end portions at least along a majority of the length of the outer surface for threading the wedge into a log portion to be split when the wedge is rotated about the central axis;

e. the outer surface having forward portions inclined at a relatively small angle of inclination to the central axis defining a boring zone along the forward end region of the outer surface, and having rearward portions inclined at a relatively larger angle of inclination to the central axis defining an opening zone along the rearward end region of the outer surface; and, f. the outer surface additionally including a splitting zone located intermediate the boring and opening zones and having outer surface portions which are inclined at an angle to the central axis intermediate the magnitudes of the angles of inclination of the forward and rearward portions.

10. The wedge of claim 9 wherein the splitting zone includes adjacent, axially spaced outer surface portions of progressively greater inclination which form a substantially continuous transition between the angles of inclination of the forward and rearward portions.

11. The wedge of claim 9 wherein the boring, splitting and opening zones each have separate, substantially constant angles of inclination along their respective lengths.

12. The wedge of claim 11 wherein the boring, splitting and opening zones have proportional respective lengths of about 2 units to 1 unit to 1 unit.

13. The wedge of claim 12 wherein the wedge has a base diameter at the rearward end of the outer surface within the range of about 2½ to 3 units in comparison with 2:1:1 ratio of lengths of the boring, splitting and opening zones.

14. The wedge of claim 9 wherein the boring zone inclination angle is within the range of about 8° to 12°.

15. The wedge of claim 9 wherein the opening zone inclination angle is within the range of about 19° to 22°.

16. The wedge of claim 9 wherein the splitting zone inclination angle is within the range of about 15° to 18°.

* * * * *